United States Patent
Chinnici et al.

(10) Patent No.: US 9,379,408 B2
(45) Date of Patent: Jun. 28, 2016

(54) HEMMED FUEL CELL STACK ENCLOSURE

(71) Applicant: GM Global Technology Operations LLC, Detroit, MI (US)

(72) Inventors: Anthony G. Chinnici, Rochester, NY (US); Jeffrey A. Rock, Fairport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 444 days.

(21) Appl. No.: 13/785,571

(22) Filed: Mar. 5, 2013

(65) Prior Publication Data

US 2014/0255818 A1    Sep. 11, 2014

(51) Int. Cl.
*H01M 8/24* (2006.01)
*H01M 2/02* (2006.01)
*H01M 8/10* (2016.01)

(52) U.S. Cl.
CPC ............ *H01M 8/248* (2013.01); *H01M 8/2475* (2013.01); *H01M 2008/1095* (2013.01); *Y02E 60/50* (2013.01); *Y02P 70/56* (2015.11)

(58) Field of Classification Search
CPC ....... H01M 2/00–2/0495; H01M 2/10–2/1094; H01M 8/2465–8/2485
See application file for complete search history.

(56) References Cited

U.S. PATENT DOCUMENTS

| | | | | |
|---|---|---|---|---|
| 4,002,287 A * | 1/1977 | Saveth | ..................... | 229/122.23 |
| 5,271,142 A * | 12/1993 | Moore et al. | ................. | 29/469.5 |
| 5,686,200 A * | 11/1997 | Barton | .................... | H01M 8/02 429/511 |
| 5,766,801 A * | 6/1998 | Inoue | .................. | H01M 2/1077 429/159 |
| 6,218,039 B1 * | 4/2001 | Mease et al. | .................. | 429/470 |
| 6,228,528 B1 * | 5/2001 | Burkholder et al. | .......... | 429/163 |
| 6,386,109 B1 * | 5/2002 | Brooks et al. | ................. | 102/306 |
| 2004/0247995 A1 * | 12/2004 | Devitt | ............................. | 429/66 |
| 2005/0250005 A1 * | 11/2005 | Bacon et al. | .................. | 429/152 |
| 2005/0255342 A1 * | 11/2005 | Lee | ......................... | H01M 8/10 429/457 |
| 2010/0092839 A1 * | 4/2010 | Kaupert | ............. | H01M 8/2475 429/470 |

(Continued)

FOREIGN PATENT DOCUMENTS

| CN | 1031045 A | 2/1989 |
|---|---|---|
| CN | 102282713 A | 12/2011 |

(Continued)

OTHER PUBLICATIONS

Machine translation of Motohashi JP 2008-181733 (Aug. 2008).*

(Continued)

*Primary Examiner* — Jonathan Crepeau
*Assistant Examiner* — Jacob Buchanan
(74) *Attorney, Agent, or Firm* — Quinn Law Group, PLLC

(57) ABSTRACT

A fuel cell system is provided which includes a compression retention enclosure with upper and lower compression shells and side sheet components coupled by interlocking hem joints. Methods for manufacturing compression retention enclosures with hem joints such that the enclosure remains sealed upon operational swelling of the fuel stack are also provided. A compression shell may be formed from a light weight composite structure having a polymeric layer interposed between steel skins, and an extension of the top steel skin may form a hemmed edge or may form a side sheet having a hemmed edge. Side sheet panels may be coupled to the end plates by interlocking two opposing hemmed edges to form the hem joint, or by sliding an opposing C-linking element between two hemmed edges held under compression force in an interlocking position.

25 Claims, 5 Drawing Sheets

(56) References Cited

U.S. PATENT DOCUMENTS

| | | | |
|---|---|---|---|
| 2010/0159345 A1* | 6/2010 | Shibata et al. | 429/470 |
| 2010/0173218 A1* | 7/2010 | Kozu | H01M 8/248 429/456 |
| 2011/0236740 A1* | 9/2011 | Paolazzi | H01M 2/0245 429/120 |
| 2011/0244355 A1* | 10/2011 | Skala | 429/468 |
| 2012/0240488 A1* | 9/2012 | Willerscheid et al. | 52/173.1 |
| 2013/0108909 A1* | 5/2013 | Matsuo | H01M 2/1061 429/99 |
| 2014/0120413 A1* | 5/2014 | Nielsen | H01M 2/021 429/179 |
| 2015/0333356 A1* | 11/2015 | Horlock | H01M 8/248 429/469 |

FOREIGN PATENT DOCUMENTS

| | | | | |
|---|---|---|---|---|
| EP | 1698410 | * | 9/2006 | B21D 26/02 |
| GB | 2509152 A | * | 6/2014 | H01M 8/247 |
| JP | 2005141935 A | | 6/2005 | |
| JP | 2008181733 A | * | 8/2008 | H01M 2/10 |
| WO | WO 2011023277 A2 | * | 3/2011 | E04B 2/74 |

OTHER PUBLICATIONS

Machine translation of Kiyofuji et al. JP 2005-141935 (Jun. 2005).*

* cited by examiner

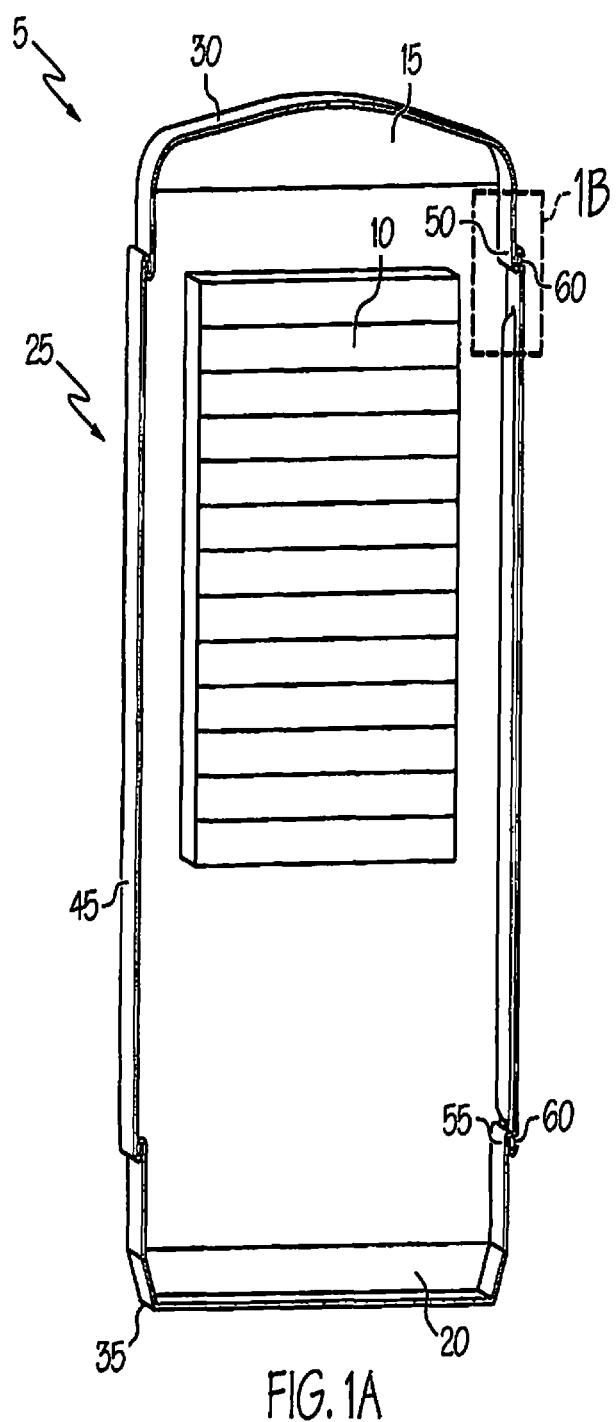
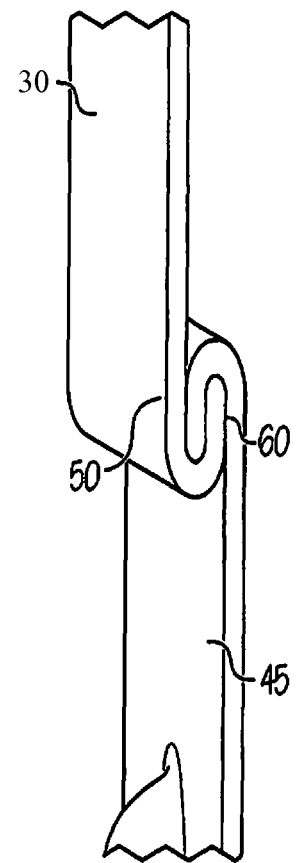
FIG. 1A
FIG. 1B

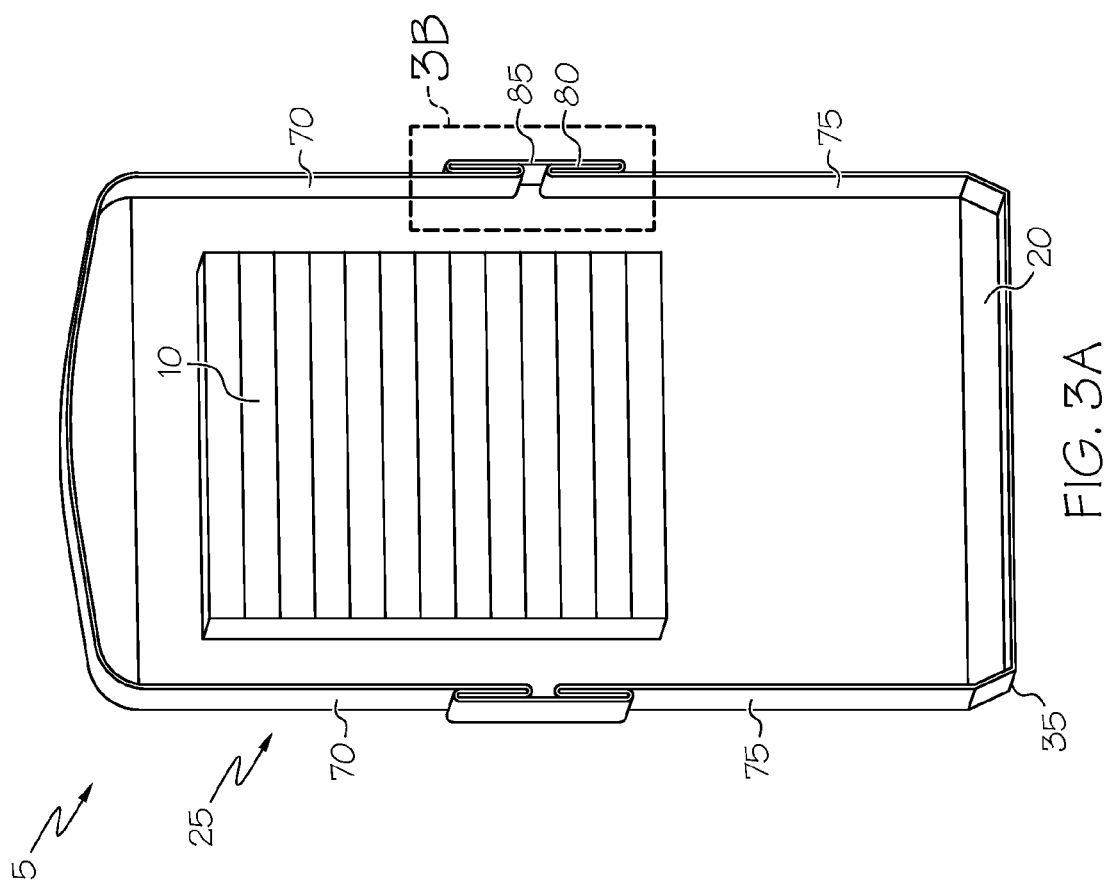

HEMMED FUEL CELL STACK ENCLOSURE

TECHNICAL FIELD

This disclosure relates generally to fuel cell systems and more particularly to a compression retention enclosure formed with components coupled by hemmed joint configurations.

BACKGROUND

Fuel cells are clean, efficient and an environmentally responsible power source for vehicles and various other applications. The fuel cell is under intense development as a potential alternative for the traditional internal-combustion engine used in modern vehicles. In proton exchange membrane (PEM) type fuel cells, a thin solid electrolytic membrane having an electrode with catalyst adjacent both sides forms a membrane electrolyte assembly (MEA). The MEA generally also includes porous conductive materials known as gas diffusion media (DM), which abut and distribute reactant gases to the anode and cathode. Hydrogen is supplied as fuel to the anode where it reacts electrochemically in the presence of catalyst to produce electrons and protons. The electrons are conducted by circuit from the anode to the cathode, and the protons migrate through the electrolyte to the cathode where oxygen reacts electrochemically in the presence of catalyst to produce oxygen anions. The oxygen anions react with the protons to form water as the fuel cell reaction product.

The MEA and DM, together with any insulating gaskets, make up a unitized electrode assembly (UEA), which is disposed between a pair of electrically conductive plates. The plates serve as current collectors for the electrodes and have appropriate openings, channels and passages formed therein for distributing the gaseous reactants over the respective electrodes, and for supplying coolant to the cell. PEM fuel cells are typically connected in series, stacked one on top of the other to form a fuel cell stack.

A fuel cell stack is ordinarily assembled under compression in order to seal the fuel cells and to secure and maintain a low interfacial electrical contact resistance between the reactant plates and the various components of the UEA. The interfacial contact resistances in a PEM fuel cell stack decrease substantially with increasing compression loading. A desired compression load on the fuel cell stack typically ranges from about 50 to about 400 psi, and is maintained by a compression retention enclosure housing the fuel cell stack. Compression retention systems are often built over-compressed to compensate for some loss in compression that occurs when the initial compression force is removed. In addition, the MEA is known to expand and contract with changes in humidity and temperatures; for example, in conventional fuel cell stacks, the MEA is known to expand by up to about 50% of its original thickness in operation. Compression retention enclosures must be designed to accommodate or cope with the strains produced by membrane swelling that can occur with both membrane expansion and compressive stress relaxation in the fuel cell stack.

A fuel cell stack assembly requires a significant amount of compressive force to squeeze the fuel cells of the stack together. The need for the compressive force comes about from the internal gas pressure of the reactants within the fuel cells plus the need to maintain good electrical contact between the internal components of the cells. Generally, the area per unit force is about 195-205 psi total, which is distributed evenly over the entire active area of the cell (typically 55-155 square inches for automotive size stacks). Thus, for a fuel cell with an area of about 80 square inches, the typical total compressive force of these size stacks is about 15,600 to 16,500 pounds.

Compression retention enclosures are designed to maintain a desired contact pressure between the bipolar plates, DM, and catalyst layers. A limited amount of compression of the DM is also known to occur under typical operational loads, however when excessive compression loads are applied to the DM, the force can physically degrade the DM by fracturing carbon fibers or breaking up binders that bind the carbon fibers together to an undesirable extent. Therefore, it is generally desirable for an appropriate compression load to be maintained and to provide a desired electrical resistance, but not to exceed the desired range during operation of the fuel cell stack. A compression retention enclosure typically includes a number of components coupled together and cooperating to maintain or retain compression on the fuel cell stack. Many different designs of compression retention enclosures exist, each offering one or more particular purported advantages over the other.

Conventional compression retention structural design focuses on the use of rigid end plates and tie rods to apply and maintain a compressive force on the fuel cell assembly. The plurality of fuel cells or fuel cell assembly to be compressed is interposed between a pair of rigid end plates. The end plates are then compressed together by tie rods that extend through or around the end plates and impart a compressive force on the end plates. Additionally, the tie rods typically extend beyond the surface of the end plates and thereby increase the volume of the stack structure. When the stack structure utilizes tie rods distributed around a periphery of the end plate to impart a compressive force on the fuel cell assembly, the proper tightening of the tie rods to impart the desired compressive force can be difficult. That is, the tie rods must be tightened in a predetermined pattern in order to attempt to apply in an evenly distributed compressive load on the fuel cell assembly. However, as each tie rod is tightened the compressive load being imparted by the end plates changes so that each tie rod must be re-tightened multiple times in an iterative process in order to achieve a generally uniform compressive force on the fuel cell assembly. Additionally, the tie rods typically extend beyond the surface of the end plates and thereby increase the volume of the stack structure.

Conventional fuel cell stack enclosures used bolted connections to retain stack load. The bolts thread into aluminum castings inside end unit assemblies, adding significant weight and bulk to the system. Further, since assembled length varies from part to part, the location of the wet end unit, which is the platform in which the lower end unit, reactant manifolds and balance of parts build from, changes, and drives design complexities in the balance of the plant. Slip joints may be required to tolerate stack height variation. Aside from making the structure difficult to environmentally seal, the use of large bolted joints adds a failure mode associated with the joints. Increased assembly time and costs, as well as increased packaging space are pragmatic considerations with conventional designs.

It would be advantageous to provide a stack structure that can more easily impart a compressive force on the fuel cell assembly, and even more advantageous if the compressive force applying means added minimal volume to the stack structure. Furthermore, it would be advantageous to provide a compression retention enclosure that retains sufficient compressive force while environmentally sealing the fuel cell assembly, and which also adds a minimal volume. It would also be advantageous to provide a fuel cell assembly with a compression retention enclosure effective in accommodating strains produced by operational membrane swelling and compressive stress relaxation in the fuel cell stack.

It would be desirable to develop a simplified design for a compression retention enclosure which minimizes the number of components required to maintain compression of the fuel cell stack, and which minimizes the mass of the fuel cell system, without compromising desired tolerances.

SUMMARY

Accordingly, the present investigators have developed a fuel cell system that overcomes these and other deficiencies in the fuel cell art. The fuel cell system disclosed herein eliminates the need for large bolted joints in the compression retention enclosure and therefore all failure modes associated with these joints. Assembly line costs are reduced by a simplified design. Replacement of rope-style seals and other known sealing mechanisms with cure-in-place (CIP) and form-in-place (FIP) sealants applied directly to the sheet metal reduces cost, bulkiness and reduces critical installation space needs. Slip joints typically required to tolerate stack height variance may be eliminated, further simplifying balance of the plant design.

One embodiment of the inventive fuel cell system comprises a fuel cell stack assembly having a plurality of fuel cells disposed between a first end plate and a second end plate, the fuel cell stack being enclosed within a compression retention enclosure. The compression retention enclosure comprises an upper compression shell disposed in contact adjacent the first end plate, a lower compression shell disposed in contact adjacent the second end plate, each compression shell having a hemmed edge extending toward and substantially coplanar with a hemmed edge of the other compression shell, and at least one side sheet, each side sheet having a first hemmed edge coupled to the upper compression shell by an interlocking hem joint and a second hemmed edge coupled to the lower compression shell by an interlocking hem joint. A first end cap and a second end cap are located at the front and rear, respectively, of the compression retention disclosure.

According to another embodiment, each compression shell has an extension extending toward and substantially coplanar with an extension of the other compression shell. The extension from the upper compression shell forms an upper side panel and the extension from the lower compression shell forms a lower side panel. Each side panel has a hemmed edge and the hemmed edges are coupled by at least one C-link member opposing the hemmed edges and interlocking the hemmed edge of the upper side panel with the hemmed edge of the lower side panel to form an interlocked hem joint.

Further embodiments provide methods for manufacturing the fuel cell systems according to the invention. In some embodiments, a fuel cell system having a fuel cell stack under a substantially sustained compression force is manufactured by enclosing a fuel cell stack in a compression retention enclosure formed with interlocking hem joints. The compression retention enclosure comprises an upper compression shell disposed in contact adjacent a first end plate, a lower compression shell disposed in contact adjacent a second end plate, and each compression shell has a hemmed edge extending toward and substantially coplanar with the hemmed edge of the other compression shell. The enclosure comprises at least one side sheet, each side sheet having a first hemmed edge coupled to the upper compression shell by an upper interlocking hem joint and a second hemmed edge coupled to the lower compression shell by a lower interlocking hem joint. An initial compressive force is applied to the compression shell sufficient to cause the hemmed edges of the compression shells to overlap with the corresponding opposing hemmed edge of the side sheet. When the initial compression force is released, the opposing hemmed edges interlock to form upper and lower interlocking hem joints, resulting in a retained/sustained compression force on the fuel cell stack substantially equal to the total tensive force of the compression retention enclosure. The difference between the initial compressive force and the total tensive force of the compression retention enclosure approximately accommodates operational membrane swell of the fuel cell stack. The compression retention enclosure possesses sufficient strength to remain substantially sealed upon operational swelling of the fuel cell stack.

In other method embodiments, each compression shell has an extension toward and substantially coplanar with an extension of the other compression shell. The extensions form side panels, each having a hemmed edge. The hemmed edges of the side panels are not in opposition; rather, they hem in the same direction. An initial compression force is applied to bring the hemmed edges within a pre-determined distance from one another and the hemmed edges may be held in this position by staking. An opposing C-link of pre-determined length matching the pre-determined distance is slid into place to form a double interlocking hem joint coupling the side panels. The retained compression is less than the initial compression, and the compression retention enclosure is capable of accommodating operational swelling of the fuel cell membranes.

The compression shells and side panels of the fuel cell stack may be welded or clinched to the end caps of the hemmed enclosure for positional stability and strength. The strength of the hemmed joint permits fabrication of compression shells and end plates with lighter weight composite materials.

These and other advantages, embodiments and details will be clarified by reference to the drawings and detailed description set forth below.

BRIEF DESCRIPTION OF THE DRAWINGS

While the specification concludes with claims that particularly point out and distinctly claim embodiments of the invention, it is believed the present invention will be better understood from the following description of certain examples taken in conjunction with the accompanying drawings. In the drawings, like numerals represent like elements throughout the several views, and various components of the drawings are not necessarily illustrated to scale.

FIG. 1A depicts a schematic coronal cross-sectional slice view of an exemplary compression retention enclosure of a fuel cell system according to some embodiments of the invention illustrating coupling of side sheets to upper and lower compression shells via interlocking hem joints.

FIG. 1B depicts a magnified view of a denoted boxed portion of FIG. 1A illustrating an interlocking hemmed joint coupling a hemmed edge to a side sheet.

FIG. 3A is a schematic coronal cross-sectional view of a compression retention enclosure of a fuel cell system according to one or more embodiments of the invention illustrating hemmed edges interlocked by a C-link member.

FIG. 3B is a magnified view of the denoted boxed portion of FIG. 3A showing hemmed edges interlocked by a C-link member.

Figure 2A:
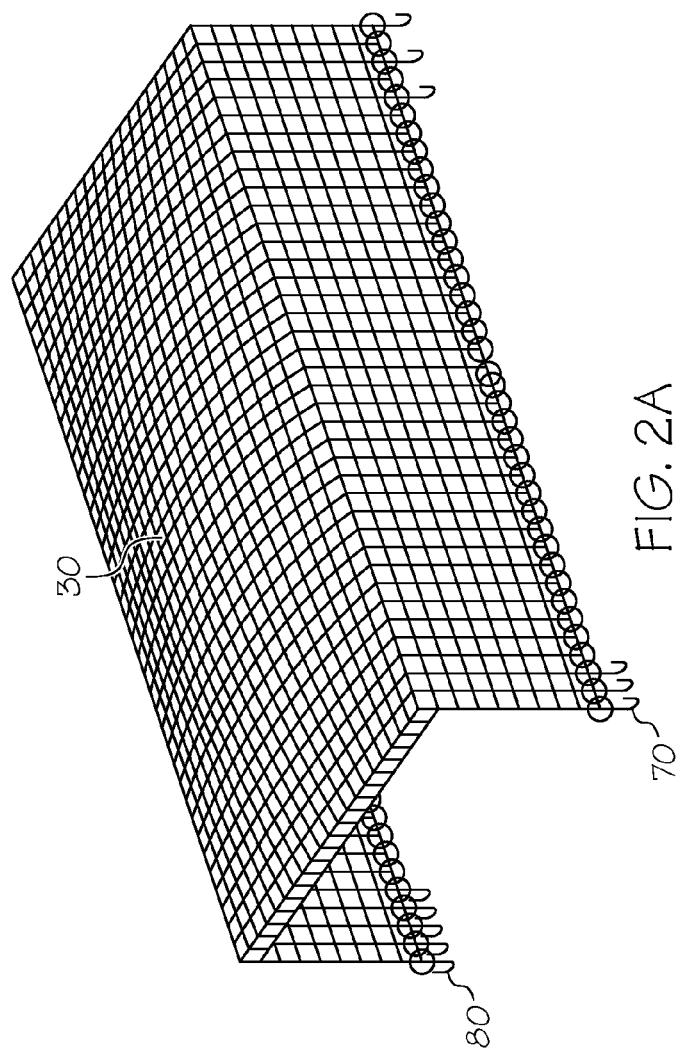
FIG. 2A depicts a perspective view of an upper compression shell according to some embodiments of the invention.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention, it being understood, however, that this invention is not limited to the precise arrangements shown.

DETAILED DESCRIPTION

Features and benefits of the various embodiments of the present invention will become apparent from the following description and appended drawings, which include examples of specific embodiments intended to give a broad representation of the invention. Various modifications will be apparent to those skilled in the art from this description and from practice of the invention. The scope is not intended to be limited to the particular forms disclosed and the invention covers all modifications, equivalents and alternatives falling within the spirit and scope of the invention as defined by the claims.

It is noted that terms like "preferably," "generally," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention, it is noted that the terms "substantially" and "approximately" are utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Referring to FIGS. 1A and 1B, one embodiment of a fuel cell system according to the invention is schematically depicted. It is understood that features of a typical fuel cell system not necessary to understanding or defining the scope of embodiments being described herein are either not depicted or depicted only in necessary detail. The fuel cell system disclosed herein includes a fuel cell stack assembly 5 comprising a plurality of fuel cells 10 disposed between a first end plate 15 and a second end plate 20. A cross-sectional coronal slice of one embodiment of a compression retention enclosure 25 housing the fuel cell stack assembly 5 is shown. A compression retention enclosure 25 is designed to maintain a compression force on components of the fuel cell stack necessary to maintain sufficient contact and to decrease contact resistance between components of the fuel cell.

The compression retention enclosure 25 comprises an upper compression shell 30 adjacent the first end plate 15. The compression shell 30 may be sealed to the end plate 15 using a form-in-place or cure-in-place sealant, and/or may be riveted, clinched or welded to the end plate 15 to provide an environmental seal. In a preferred embodiment, the compression shell 30 may be secured to the end plate 15 by a punch and die type clinching process such as the TOG-L-LOC® process marketed by BTM Corporation. In some embodiments an insulation layer may be disposed between the compression shell 30 and the end plate 15 and may be included in the securing/sealing mechanism. As used herein, "adjacent" is not meant to exclude an intervening insulation layer. The lower compression shell 35 may also be in contact adjacent a second end plate 20, generally at the wet end of the fuel cell stack assembly 5.

The upper compression shell 30 and the lower compression shell 35 each have at least one hemmed edge 50 extending toward and substantially coplanar with a hemmed edge 55 of the other compression shell. The hems are in opposing orientation with respect to one another. As used herein, "opposing orientation" means that the hems are oriented in opposite directions and are thereby capable of engaging one another to form a hemmed joint 60. The compression retention enclosure 25 also comprises at least one side sheet 45, which may wrap around the circumference of the stack assembly 5. The lateral edges may overlap forming a seam which is sealed. Where lateral edges of side sheets overlap, cure-in-place and/or form-in-place sealants may be used to secure the edges forming a secure environmental seal. In other embodiments the compression retention enclosure 25 comprises more than one side sheet 45. Each side sheet 45 has a first hemmed edge 50 coupled to the upper compression shell 30 by an interlocking hem joint 60 and a second hemmed edge 55 coupled to the lower compression shell 35 by an interlocking hem joint 60.

The fuel cell system 1 is typically designed so that the compression retention enclosure 25 exerts a sustained compression force on the fuel cell stack assembly 5. Generally the compression retention enclosure is formed under an initial compression sufficient to position the hemmed edges to interlock upon release of the initial compression. The components of the fuel cell stack assembly 5 are arranged in a press and compressed to a predetermined tonnage with an over-compression factor added to facilitate side tension cover assembly. The press pressure is released leaving the fuel cell stack compressed by the compression retention enclosure 25 at the desired working tonnage.

By forming the interlocking hemmed joints 60 under a sustained (also referred to as retained) compression force, the hemmed joint 60 and side sheets 45 will be subject to a total tension/tensive force substantially equal to the sustained compressive force. The present investigators surprisingly discovered that a compression retention enclosure 25 according to the invention possesses sufficient strength to remain substantially environmentally sealed even upon operational swelling of the fuel cell stack assembly 5.

Another benefit realized by the present design includes the capability of fabricating match-fit side sheets to a predetermined fuel cell stack height. Stack height variation is a problem well-known in the art. In conventional designs, slip joints may be employed to tolerate stack height variation. In accordance with embodiments disclosed herein, stack variation based on fuel cell module packing requirements may be factored out providing more usable packaging space. Elimination of slip joints simplifies the balance of parts design.

Environmental sealing is rendered more robust by eliminating rope style seals and replacing them with coating applied to the sheet metal directly by any known sealing technique, for example those widely used in the canning industry, or by cure-in-place or form-in-place enclosed seal material.

Referring to FIG. 2A, the present investigators experimented with various design options and according to one preferred embodiment, the upper compression shell 30 is generally dome-shaped, although other shapes including a substantially planar design may be employed. The strength of the sealing imparted by the hemmed joint design enables fabrication of the compression shells from lightweight composite materials.

Figure 2B:
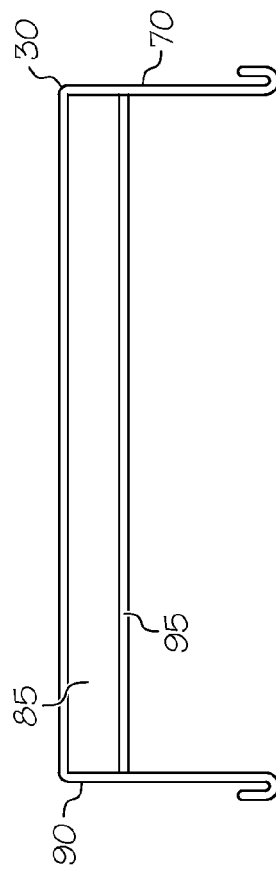
FIG. 2B depicts a schematic coronal cross-sectional view of an upper compression shell according to one or more embodiments of the present invention.

Referring to FIG. 2B, according to some embodiments, the composite material has a polymeric layer and a metallic layer. Non-limiting examples of suitable metals include steel and aluminum, and in specific embodiments the steel is stainless steel or advanced high strength steel. In other specific embodiments the steel is a dual phase (DP) steel and in still other specific embodiments the steel is a transformation-induced plasticity (TRIP) steel. Very specific embodiments include DP 350/600, TRIP 350/600, stainless steel, for example SS 304, and combinations thereof. It is contemplated that a compression shell and panel may be fabricated from different materials with material proportions optimized, for example with respect to cost. In one embodiment a combination of shell and panels comprises stainless steel and a DP or TRIP steel.

In specific embodiments the polymeric layer is a polymeric core 85 and the composite material comprises a polymeric core 85 interposed between a bottom steel skin 95 and a top steel skin 90. In very specific embodiments a hemmed edge of a compression shell is an extension of the top steel skin 70. Non-limiting examples of polymeric material suitable for manufacture of the core include foams such as syntactic foams. Syntactic foams are composite materials synthesized by filling a metal, polymer or ceramic matrix with hollow particles called microballoons, "syntactic" meaning "put together". The presence of hollow particles results in lower density, higher strength, and a lower coefficient of thermal expansion. The matrix material can be selected from almost any metal, polymer or ceramic. A wide variety of microballoons are available, including cenospheres, glass microspheres, and carbon and polymer microballoons. Specific examples of syntactic foams include glass microballoon-epoxy, glass microballoon-aluminum and cenosphere-aluminum.

The compressive properties of syntactic foams primarily depend on the properties of microballoons, whereas the tensile properties depend on the matrix material that holds the microballoons together. Properties of the materials may be adjusted by changing the volume fraction of microballoons in the syntactic foam structure or by using microballoons of different wall thickness. In general, the compressive strength of the material is proportional to its density. Specifically suitable foams include epoxy-based syntactic foams with varying volume fractions of hollow soda-lime glass microballoons or cenospheres.

In other embodiments all or part of the polymer section can be injection-molded plastic wherein the molded plastic comprises any of a number of plastics known in the art for high compressive strength. A specific example comprises nylon 6-6 and a very specific example comprises short glass fiber reinforced nylon 6-6 such as 30% glass fiber reinforced nylon 6-6. In the all-molded embodiment, some epoxy or other adhesive may be required to bond the skin to the core.

According to some embodiments, the hemmed edges 50, 55 are positioned for coupling by applying an initial compressive force to the compression shells 30,35 sufficient to overlap the hemmed edges of the compression shells 30,35 with the corresponding hemmed edges of the side sheet 45 such that when the compressive force is released, the hemmed edges interlock to form upper and lower interlocking hem joints 60. This results in a sustained compression force on the fuel cell stack 5 substantially equal to the total tensive force of the compression retention enclosure 25. In specific embodiments, the difference between the initial compressive force and the total tensive force of the compression retention enclosure 25 approximately accommodates operational membrane swell of the fuel cell stack without compromising the environmental seal.

Referring to FIGS. 3A and 3B, an alternative embodiment is depicted where, rather than side sheets, the extension from the upper compression shell 30 forms an upper side panel 70 and the extension from the lower compression shell 35 forms a lower side panel 75. The side panels are substantially coplanar and each side panel has one hemmed edge 80 oriented toward the hemmed edge 80 of the corresponding side panel such that the hems are not opposing and therefore could not be brought into an interlocking position. At least one C-link member 85 opposes the hemmed edges 80. The hemmed edge of the upper side panel 70 and the hemmed edge of the lower side panel 75 are brought into a fixed position such that the C-link member 85 slides in place, securing the two panels to one another via a double-interlocking hem joint. The C-link member 85 may be co-extensive in length with the lateral length of the side panel, or more than one C-link member 85 may slide into position to secure the side panels 70,75.

Figure 4:
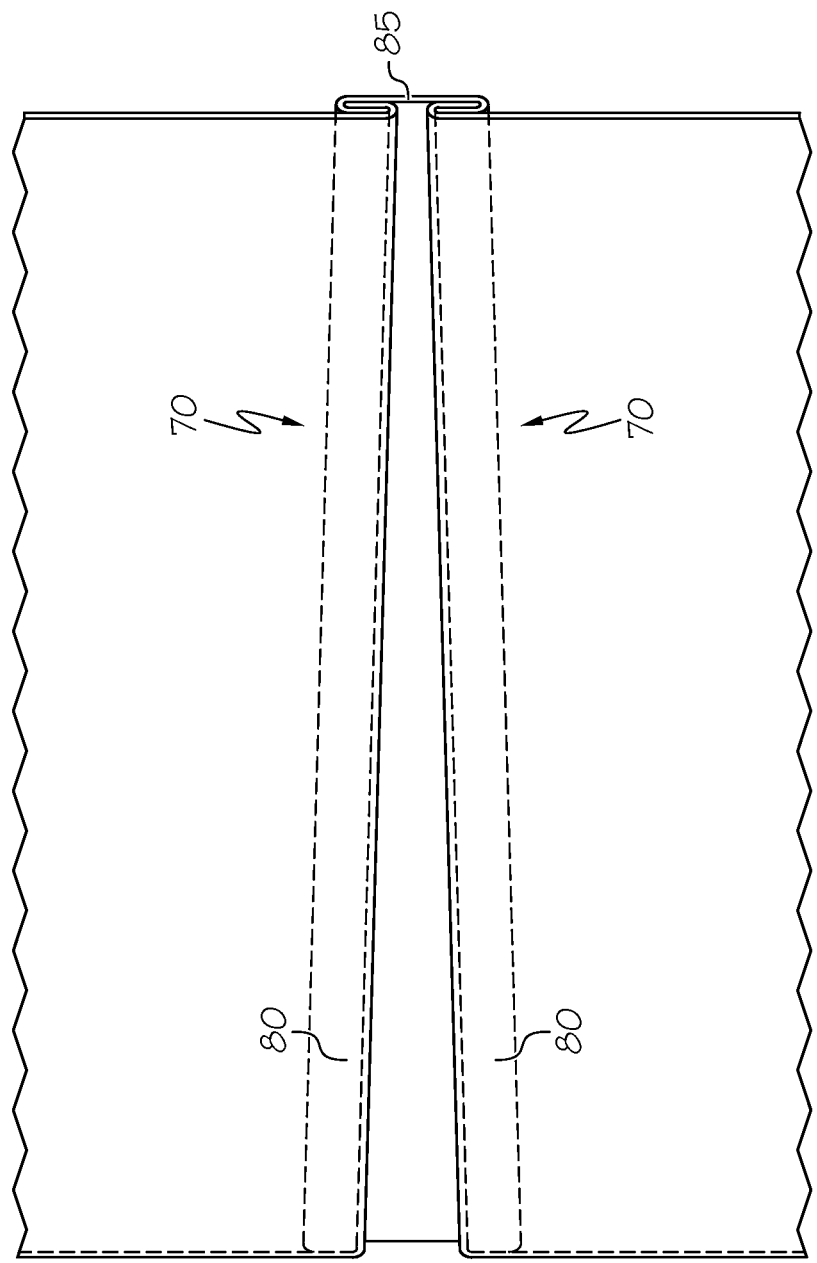
FIG. 4 is a schematic representation of a method for positioning a C-link member to effectuate coupling two hemmed edges according to some embodiments of the invention.

As schematically depicted in FIG. 4, the hems are interlocked with at least one C-link member 85 while under an initial compression force. The initial force may be applied to position the hemmed edges 80 of the side panels a pre-determined distance from one another and the position may be held by any compression staking mechanism. The pre-determined length matches a pre-determined dimension of the C-link member 85 that permits the C-link member 85 to slide easily into place along the grooves of the hemmed edges 80. By "match" it is meant that the length is substantially equal to or less than the "gripping" length (i.e. the vertical rather than cross-car length) of the C-link member depending on the degree of over-compression desired. When the initial compressive force is released, the C-link member 85 and hemmed edges 80 interlock forming a double-interlocked hemmed joint. The tensive force created on the hemmed joint and side panels upon interlocking is approximately equal to the sustained compressive force of the compression retention enclosure 25 on the fuel cell stack assembly 5. The compression retention enclosure according to the invention possesses sufficient strength to remain substantially sealed even upon operational swelling of the fuel cell stack, which is accommodated by the initial over-compression.

The compression shells 30, 35 of the compression retention enclosure 25 comprising hemmed joints in accordance with the disclosure may be fabricated from a lighter weight composite material, as schematically illustrated in FIG. 2B, which in some embodiments comprises a polymeric layer and a steel layer. In specific embodiments the polymeric layer is comprised of a polymer and forms a polymeric core 85 and the composite material comprises the polymeric core 85 interposed between a bottom steel skin 95 and a top steel skin 90. The extensions forming the side panels 70,75 may be extensions of the top steel skin layers 90 of the compression shell 30,35 fabricated with composite material.

Figure 5:
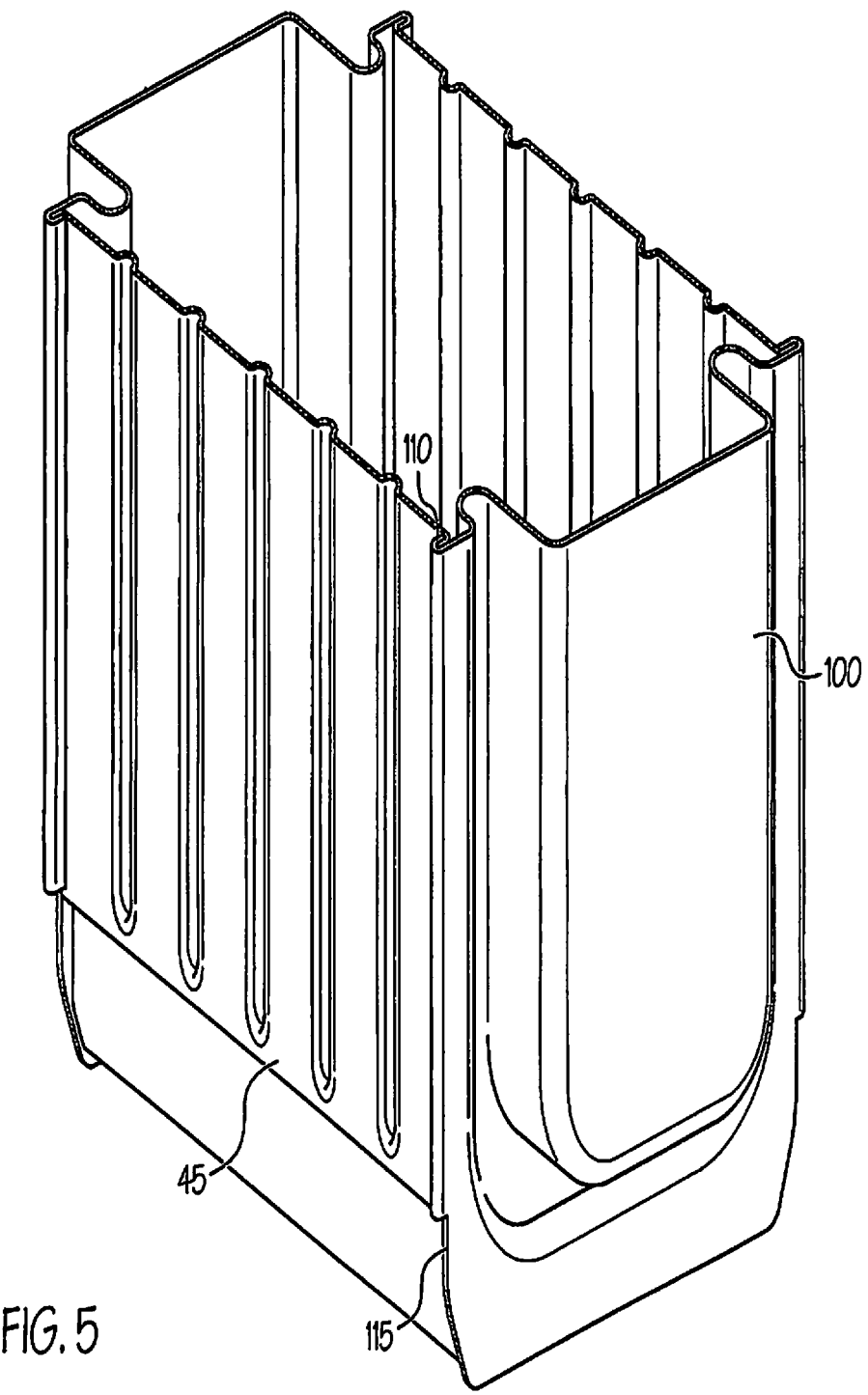
FIG. 5 depicts a compression retention system having the upper portion cut away to show coupling and sealing of a side panel to an end cap.

Regarding FIG. 5, a compression retention system typically includes a first end cap positioned across the front, and a second end cap positioned across the rear. In some embodiments of the invention an edge of a side panel adjacent an edge of an end cap has an edge lip creating a contact area 110 with the adjacent edge of an end cap 115 suitable for both sealing and securing by, for example, a metal welding process. In certain embodiments, a side panel 45 is secured to an end cap 100 at the contact area 110 by a sheet metal welding process such as projection welding. In still other embodiments the side panel 45 may be secured to the end cap 100 cap by self-piercing rivets such as the FASTRIV® fastener system available from Advel. In other embodiments a joint may be biased to an upper or lower limit using holes a known distance apart within two adjacent components and secured with traditional bolted fasteners. Weight and cost optimization are factors in consideration of fastener selection.

Having described the invention in detail and by reference to specific embodiments, it will nonetheless be apparent that modifications and variations are possible without departing from the scope of the invention defined in the appended claims. In particular it is contemplated that the scope of the present invention is not necessarily limited to stated preferred aspects and exemplified embodiments, but should be governed by the appended claims.

What is claimed is:

1. A fuel cell system comprising:
   a fuel cell stack assembly having a plurality of fuel cells disposed between a first end plate and a second end plate; and
   a compression retention enclosure comprising an upper compression shell disposed in contact adjacent the first end plate, a lower compression shell disposed in contact adjacent the second end plate, the upper compression shell having a descending extension substantially orthogonal to the first endplate, the lower compression shell having an ascending extension substantially orthogonal to the second end plate, said descending extension extending toward and substantially coplanar with said ascending extension, and each extension having an outwardly hemmed edge coplanar with the outwardly hemmed edge of the other extension, and at least one side sheet, each side sheet having a first hemmed edge coupled to the upper compression shell by an interlocking hem joint and a second hemmed edge coupled to the lower compression shell by an interlocking hem joint.

2. The fuel cell system according to claim 1 comprising a sustained compression force on the fuel cell stack assembly substantially equal to a total tensive force of the compression retention enclosure.

3. The fuel cell system according to claim 2, wherein the compression retention enclosure possesses sufficient strength to remain substantially sealed even upon operational swelling of the fuel cell stack.

4. The fuel cell system according to claim 1, wherein the at least one side sheet is match-fit to a predetermined fuel cell stack height.

5. The fuel cell system according to claim 1, further comprising first and second end caps and a side panel edge adjacent an end cap edge is disposed to form a contact area between the side panel and end cap, wherein the first and second end caps are coupled to the side sheets via clinching, welding or self-piercing rivets at the contact area.

6. The fuel cell system according to claim 5, wherein the first and second end caps are welded to the side sheets by a projection weld.

7. The fuel cell system according claim 5, wherein the first and second end caps are clinched to the side sheets by an interlocking clinch.

8. The fuel cell system according to claim 5, wherein a cure-in-place or form-in-place sealant forms a sealing contact between the compression shells, side sheets and end caps to seal the compression retention enclosure.

9. The fuel cell system according to claim 1 wherein the upper compression shell is generally dome-shaped.

10. The fuel cell system according to claim 1 wherein at least one of the upper and lower compression shells is fabricated from a composite material comprising a polymeric layer and at least one metallic layer.

11. The fuel cell system according to claim 10 wherein the at least one metallic layer comprises steel and/or aluminum.

12. The fuel cell system according to claim 11 wherein the steel comprises an advanced high strength steel (AHSS) selected from DP and TRIP steels.

13. The fuel cell system according to claim 12 wherein DP steel is selected from DP 350 and DP 600, and TRIP steel is selected from TRIP 350 and TRIP 600.

14. The fuel cell system according to claim 10, wherein the polymeric layer is a polymeric core and the composite material comprises a polymeric core interposed between a bottom steel skin layer and a top steel skin layer.

15. The fuel cell system according to claim 14, wherein a hemmed edge of the upper compression shell is an extension of the top steel skin layer and a hemmed edge of the lower compression shell is an extension of the bottom steel skin layer.

16. The fuel cell system according to claim 10, wherein the polymeric layer comprises a polymer selected from a plastic suitable for injection molding, or a syntactic foam.

17. The fuel cell system according to claim 1 further comprising an insulating layer interposed between the compression retention enclosure and the fuel cell stack.

18. A method of manufacturing a fuel cell system having a fuel cell stack under a substantially sustained compression force, the method comprising: enclosing a fuel cell stack having a plurality of fuel cells disposed between a first end cap and a second end cap in a compression retention enclosure, the compression retention enclosure comprising an upper compression shell disposed in contact adjacent the first end cap, a lower compression shell disposed in contact adjacent the second end cap, each compression shell having a hemmed edge extending substantially parallel to the end cap and coplanar with a hemmed edge of the other compression shell, and at least one side sheet, each side sheet having a first hemmed edge coupled to the upper compression shell by an upper interlocking hem joint and a second hemmed edge coupled to the lower compression shell by a lower interlocking hem joint, wherein the hemmed edges are positioned for coupling by applying an initial compressive force to the compression shells sufficient to overlap the hemmed edges of the compression shells with the corresponding hemmed edges of the side sheet such that when the compressive force is released, the hemmed edges interlock to form the upper and lower interlocking hem joints, resulting in a sustained compression force on the fuel cell stack substantially equal to the total tensive force of the compression retention enclosure, and wherein the difference between the initial compressive force and the total tensive force of the compression retention enclosure approximately accommodates operational membrane swell of the fuel cell stack.

19. A fuel cell system comprising:
   a fuel cell stack assembly having a plurality of fuel cells disposed between a first end plate and a second end plate;
   a compression retention enclosure comprising an upper compression shell disposed in contact adjacent the first end plate, a lower compression shell disposed in contact adjacent the second end plate, each compression shell having an extension toward and substantially coplanar with an extension of the other compression shell, the extension from the upper compression shell forming an upper side panel and the extension from the lower compression shell forming a lower side panel, each side panel having an outwardly hemmed edge;

at least one C-link member opposing the outwardly hemmed edges and interlocking the hemmed edge of the upper side panel with the hemmed edge of the lower side panel to form an interlocked hem joint.

20. A method of manufacturing a fuel cell system according to claim 19, the method comprising: applying an initial compressive force to the compression shells sufficient to position the hemmed edge of the upper side panel relative to the hemmed edge of the lower side panel such that the C-link member slides into interlocking position; releasing the initial compressive force to engage the interlocking hem joint, resulting in a sustained compression force on the fuel cell stack substantially equal to a total tensive force of the compression retention enclosure, wherein the difference between the initial compressive force and the total tensive force of the compression retention enclosure approximately accommodates membrane swell of the fuel cell stack.

21. A fuel cell system according to claim 19, comprising a sustained compressive force on the fuel cell stack substantially equal to a total tensive force of the compression retention enclosure.

22. The fuel cell system according to claim 19, wherein the compression retention enclosure possesses sufficient strength to remain substantially sealed even upon operational swelling of the fuel cell stack.

23. The fuel cell system according to claim 19 wherein the upper and lower compression shells are fabricated from a composite material comprising a polymeric layer and a steel layer.

24. The fuel cell system according to claim 21, wherein the polymeric layer is a polymeric core and the composite material comprises a polymeric core interposed between a bottom steel skin layer and a top steel skin layer.

25. The fuel cell system according to claim 24, wherein the extensions forming the side panels are extensions of the bottom steel skin layer of the lower compression shell and the top steel skin layer of the upper compression shell.

* * * * *